Figure 1:
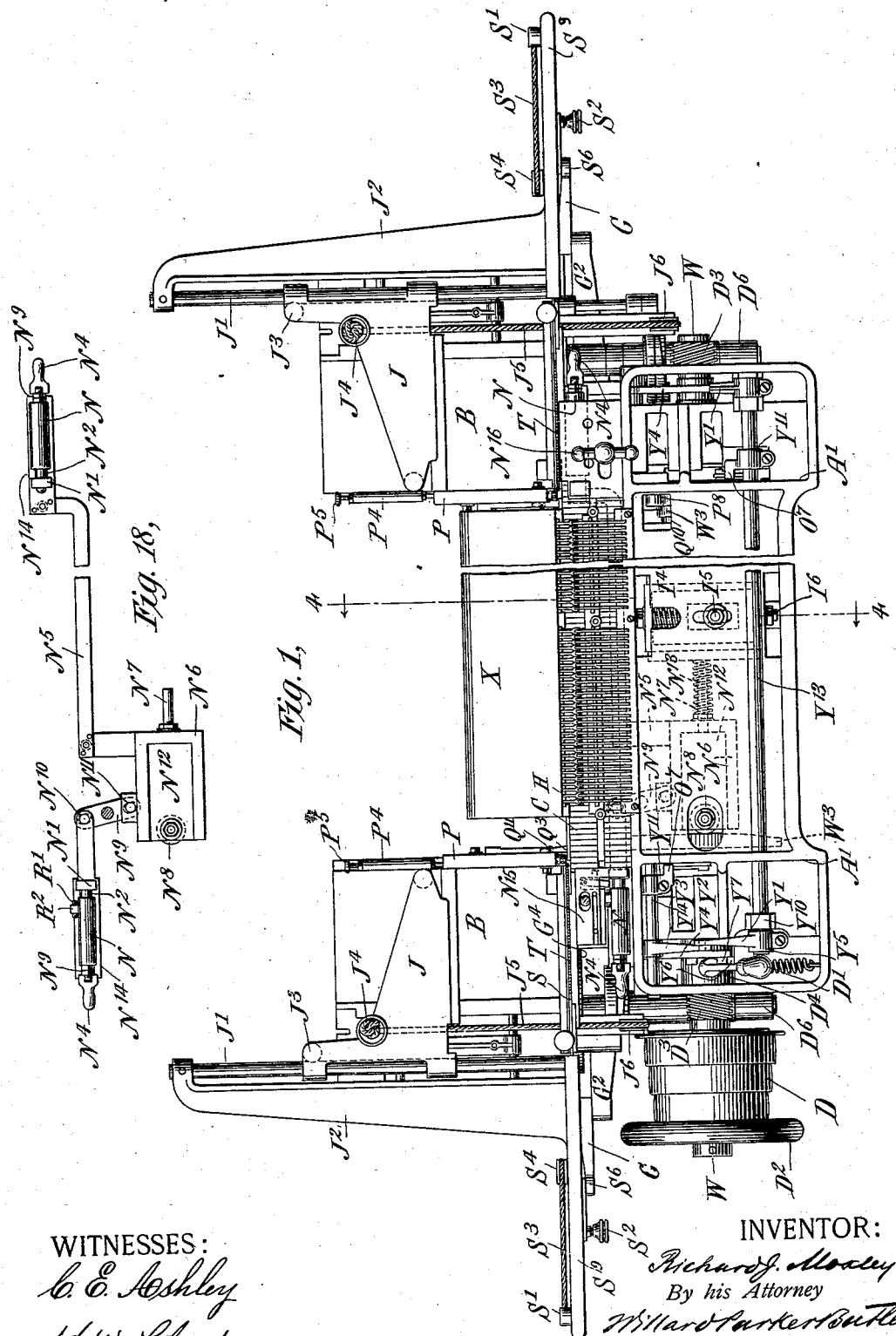

(No Model.) 10 Sheets—Sheet 4.

R. J. MOXLEY.
TYPE DISTRIBUTING MACHINE.

No. 567,252. Patented Sept. 8, 1896.

WITNESSES:
C. E. Ashley
I. W. Lloyd.

INVENTOR:
Richard J. Moxley
By his Attorney
Willard Parker Butler (No Model.)  
10 Sheets—Sheet 5.

R. J. MOXLEY.
TYPE DISTRIBUTING MACHINE.

No. 567,252.  
Patented Sept. 8, 1896.

WITNESSES:  
C. E. Ashley  
I. W. Lloyd

INVENTOR:  
Richard J. Moxley  
By his Attorney  
Willard Parker Butler (No Model.) 10 Sheets—Sheet 6.

R. J. MOXLEY.
TYPE DISTRIBUTING MACHINE.

No. 567,252. Patented Sept. 8, 1896.

WITNESSES:
C. E. Ashley
H. W. Lloyd

INVENTOR:
Richard J. Moxley
By his Attorney
Willard Parker Butler

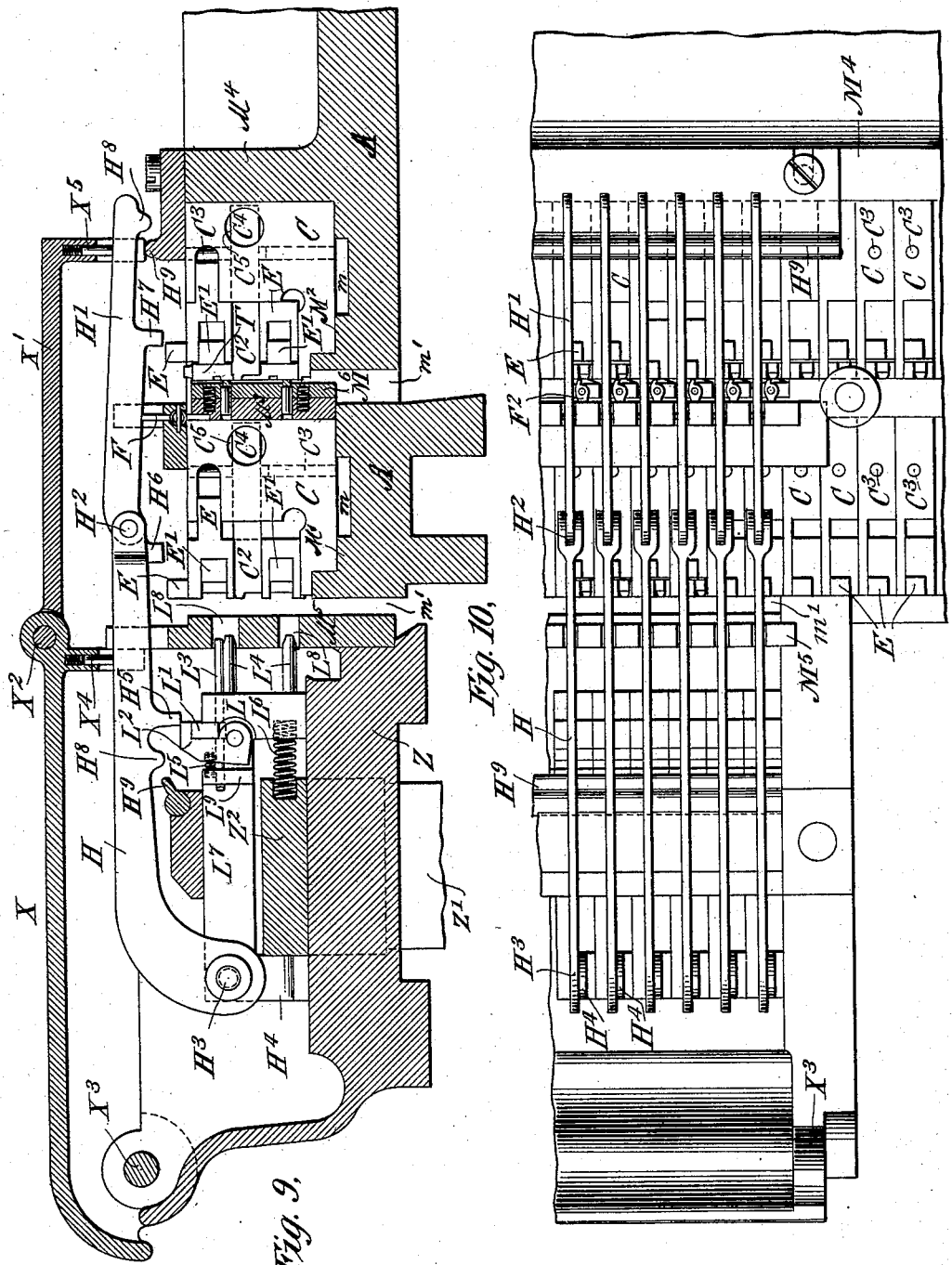

(No Model.) 10 Sheets—Sheet 8.
R. J. MOXLEY.
TYPE DISTRIBUTING MACHINE.
No. 567,252. Patented Sept. 8, 1896.
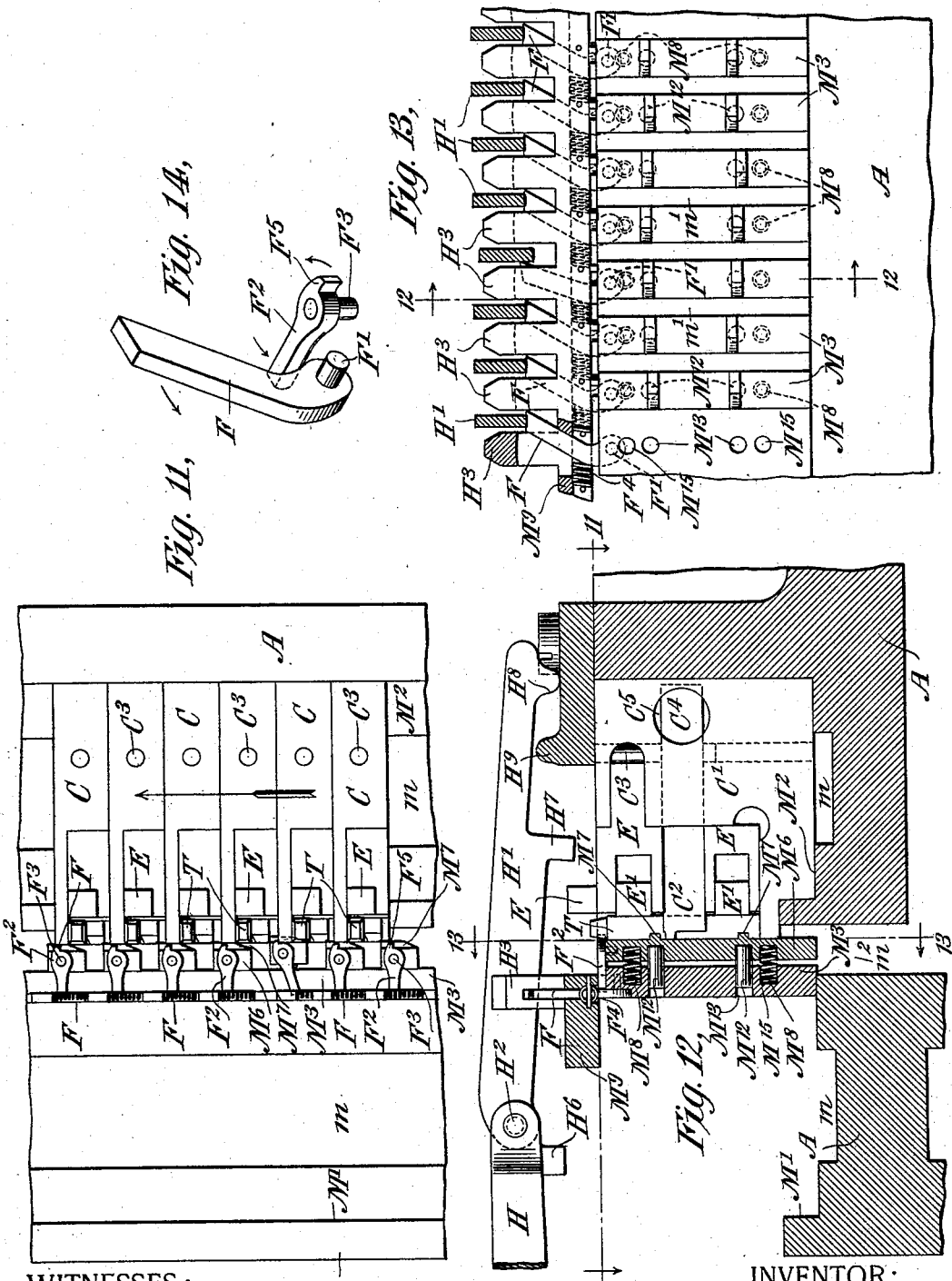
WITNESSES:
C. E. Ashley
H. W. Lloyd
INVENTOR:
Richard J. Moxley
By his Attorney
Willard Parker Butler (No Model.) 10 Sheets—Sheet 9.
R. J. MOXLEY.
TYPE DISTRIBUTING MACHINE.
No. 567,252. Patented Sept. 8, 1896.
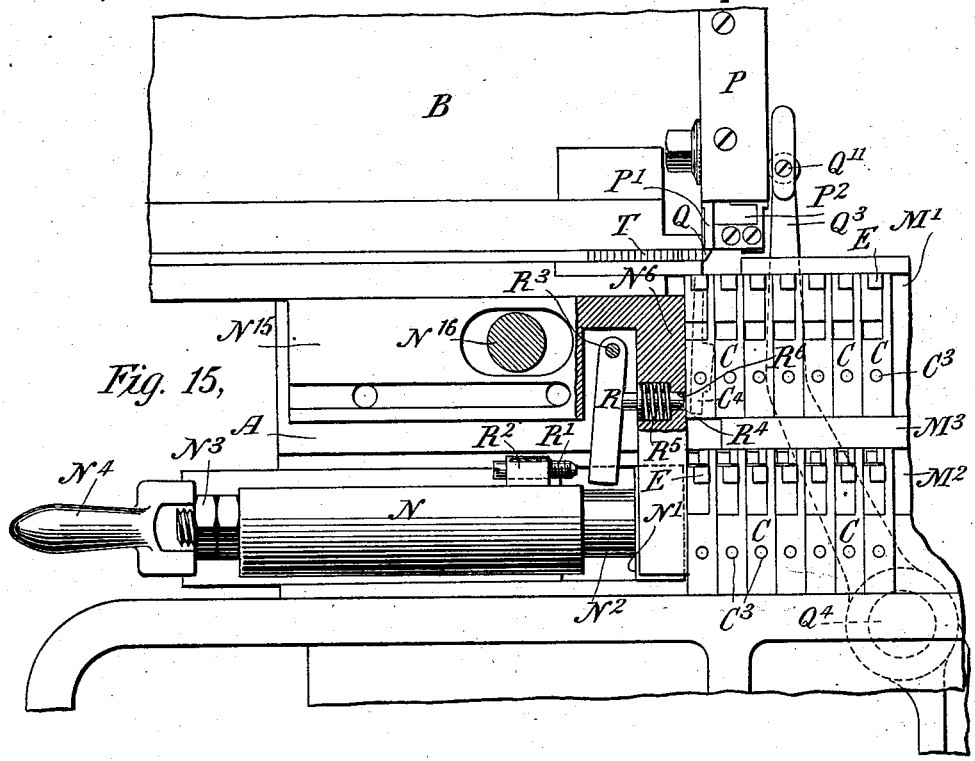
Fig. 15,
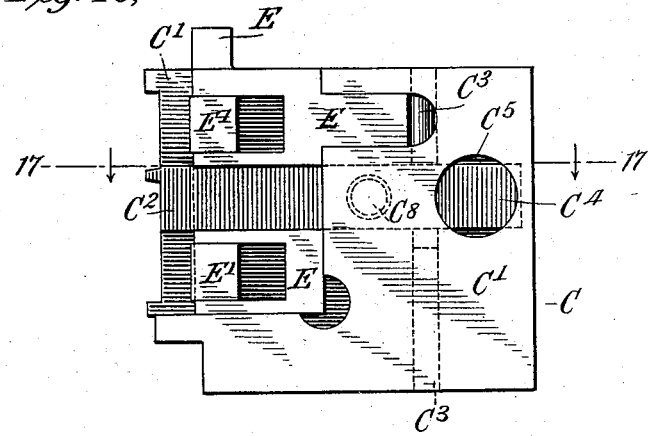
Fig. 16,
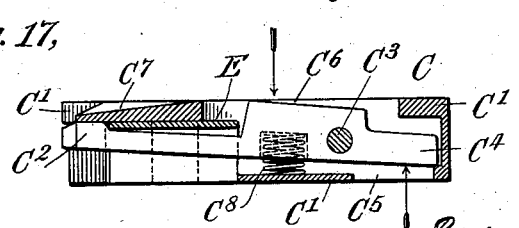
Fig. 17,
WITNESSES:
C. E. Ashley
H. W. Lloyd.
INVENTOR:
Richard J. Moxley
By his Attorney
Willard Parker Butler (No Model.) 10 Sheets—Sheet 10.

R. J. MOXLEY.
TYPE DISTRIBUTING MACHINE.

No. 567,252. Patented Sept. 8, 1896.

WITNESSES:
C. E. Ashley
J. W. Lloyd.

INVENTOR:
Richard J. Moxley
By his Attorney
Willard Parker Butler

UNITED STATES PATENT OFFICE.

RICHARD J. MOXLEY, OF NEW YORK, N. Y., ASSIGNOR TO THE EMPIRE TYPE-SETTING MACHINE COMPANY, OF SAME PLACE.

TYPE-DISTRIBUTING MACHINE.

SPECIFICATION forming part of Letters Patent No. 567,252, dated September 8, 1896.

Application filed November 2, 1895. Serial No. 567,723. (No model.)

*To all whom it may concern:*

Be it known that I, RICHARD J. MOXLEY, a citizen of the United States of America, and a resident of the city, county, and State of New York, have invented certain new and useful Improvements in Type-Distributing Machines, of which the following is a specification.

My invention relates to improvements in machines for distributing type, and particularly to that class of type-distributing machines which were invented originally by C. W. Dickinson and subsequently improved upon by Lorenz and Lewis J. Johnson, and heretofore secured by Letters Patent of the United States No. 174,900, dated March 21, 1876; No. 174,899, dated March 21, 1876; No. 174,915, dated March 21, 1876, and No. 526,106, dated September 18, 1894. The same more particularly relates to improvements in certain parts of the mechanism of the machines described in the aforesaid Letters Patent.

The object of the improvements is to increase the efficiency of the machine by doubling its discharge capacity, and by utilizing for this purpose certain elements existing in the present form of machine which, during certain periods of time while the machine is in operation, perform no function whatsoever.

The general description of the so-called "Dickinson" type of type-distributing machine upon which the present invention is an improvement is that type or class of type-distributing machines which distribute type automatically from a horizontal column into the separate vertical channels of a case in which they are so arranged as to be held for use in an automatic type-setter by means of carriers which take up the line letter by letter, and from which the proper letter for each channel is selected by appropriate selecting mechanism. This type of machine performs a series of operations by which the aforesaid result is produced:

First. By means of automatically-acting mechanism it separates a single line of type from the column of which it forms a part from its place upon a table or galley, advances the line a given distance, and then automatically presents it to the action of the machine for distribution.

Second. It separates a single type from the end of the advanced line and forces it into the clutch of a traveling carrier which is advanced by appropriate mechanism so as to receive it. The carrier is then transported away by suitable mechanism from the point of reception, thereupon giving place to another carrier, which in its turn repeats the operation and receives and transports away the next succeeding type.

Third. It moves the carriers, step by step, in a straight line on a horizontal table or bed, resting at each step, each type being held within separate and independent carriers, and when at rest within the carriers it subjects each particular type at each step to the contact of feelers, of which there are as many as there are characters of type to be distributed, and which feelers are caused by suitable mechanism to be brought against the exposed edges of the type while still held within the carriers, and to ascertain the denominations of the type by entering or failing to enter notches cut in different positions into the edges of the type and in different combinations, according to the different denominations of type in the particular font which is used.

Fourth. When a type is brought in front of a feeler whose projections match or fit the notches cut in its edge, the feeling apparatus actuates and allows a hook to fall and catch the sliding ejector of the particular carrier against which the type is supported, which hook is caused to slide forward at the moment that the feeler apparatus is withdrawn, and thus forces the type out of the carrier and permits it to enter the mouth of its appropriate conductors, through which it drops into the appropriate one of a series of channels placed at the lower ends of the type-conductors.

It will be obvious from the foregoing description and from an examination of the various patents above referred to that after the types are raised from the carriers, letter by letter, the carriers reach the end of the raceway in which they travel and are thereupon removed from that raceway by appropriate mechanism into a similar lateral raceway parallel to and behind the raceway in which they primarily moved, and are then moved up the second raceway entirely empty in a continuous solid line, and as they arrive at the end of the line opposite to the point where the operation of receiving a type from the line to be distributed commences are again by appropriate mechanism advanced into the first raceway, one by one, for the purpose of receiving and transporting away the type from the point of reception.

It will be observed that during a period of time equal to that occupied by any one carrier in traveling down the raceway, which equals the number of characters in the particular font used, multiplied by the time occupied by each pause or "step" of the carriers, the returning carriers in the second raceway are performing no function by reason of the fact that they are empty, but at the same time are being step by step advanced substantially in the same way as they are being advanced in the first raceway, thus consuming the power in the machine.

I have discovered that it is possible by slightly modifying the position of the second raceway, by providing appropriate mechanism for feeding a second line of type to the empty carriers in the second raceway at the opposite end of the machine, by providing a second set of feeler mechanism and feelers actuated in connection with the original feeling mechanism to which the type in the carriers in the first raceway are subjected, and by providing suitable channels into which the type from the carriers in the second raceway are dropped it is possible to double the output of the machine and to make each set of mechanism subject the type in each carrier to the selective action of the feeler mechanism for each character during its travel along each raceway.

The invention consists, broadly, in doubling the capacity for distribution of the Dickinson machine as modified and improved by Lorenz and Johnson in the manner above suggested by means of the modifications and mechanism hereinafter more particularly described, and narrowly in effecting certain modifications and improvements in the particular feeling mechanism employed which render this doubling of the output of the machine possible.

The invention will be best understood by a reference to the accompanying ten sheets of drawings, forming a part of this specification, in which—

Figure 2:
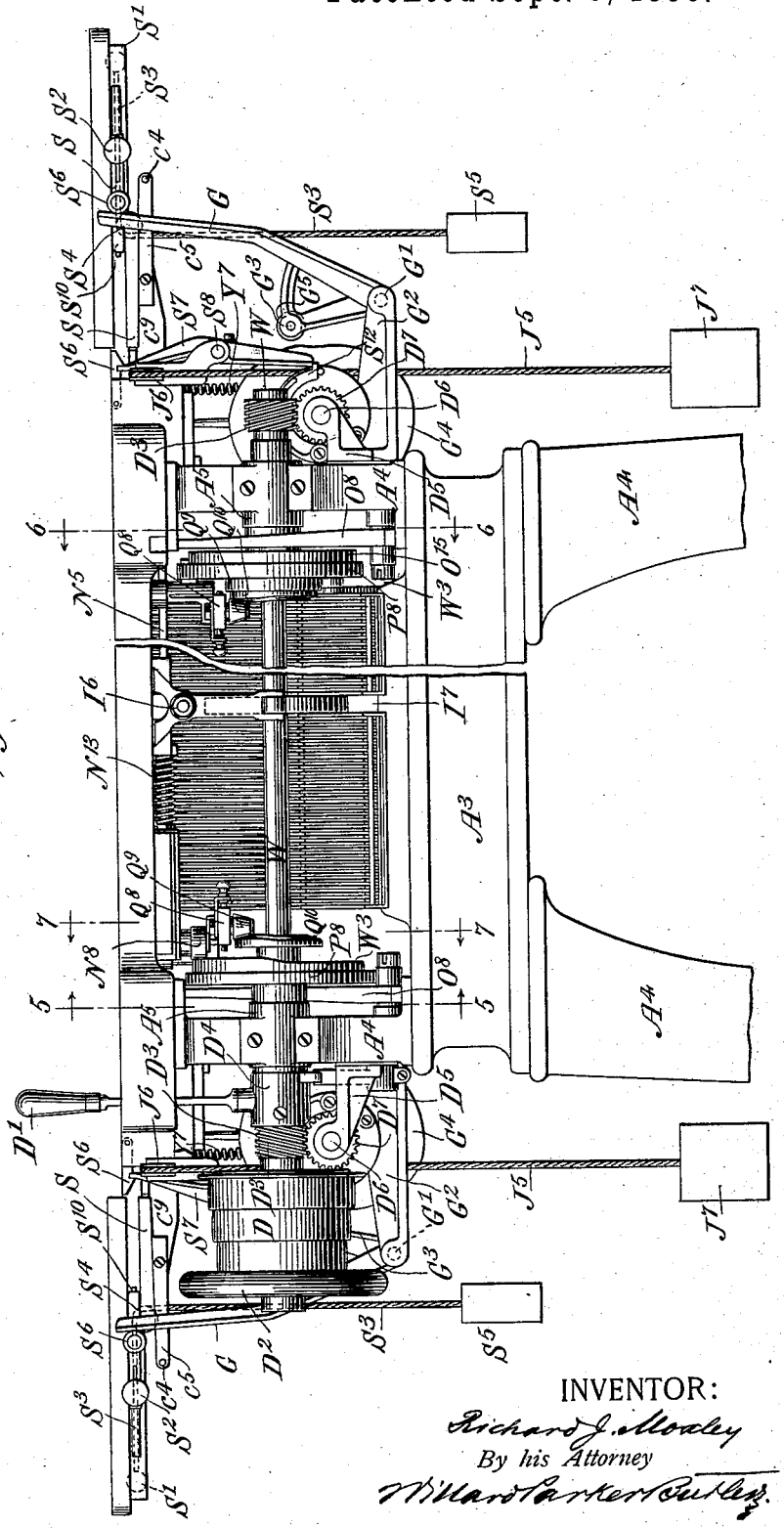
Figure 3:
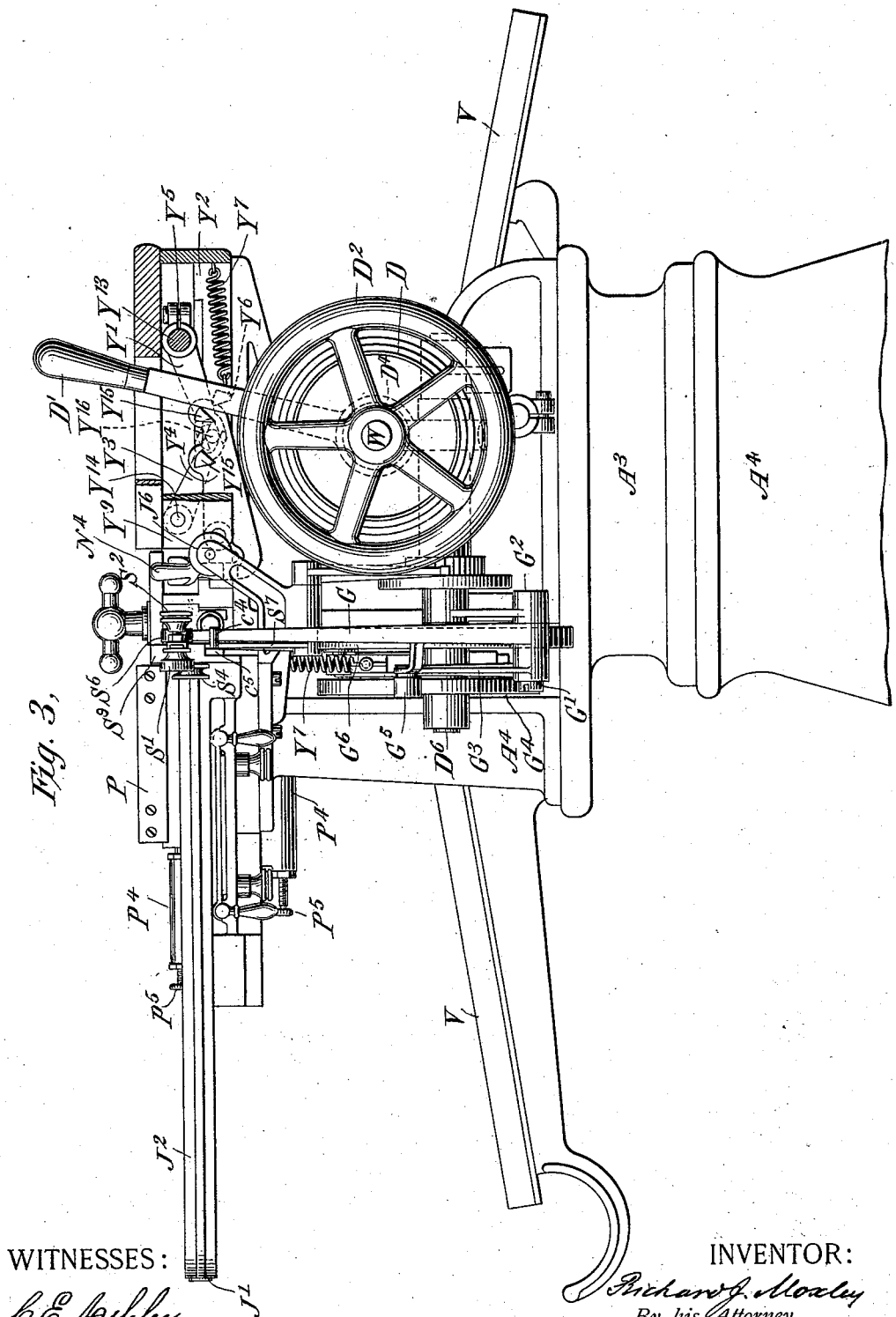
Figure 4:
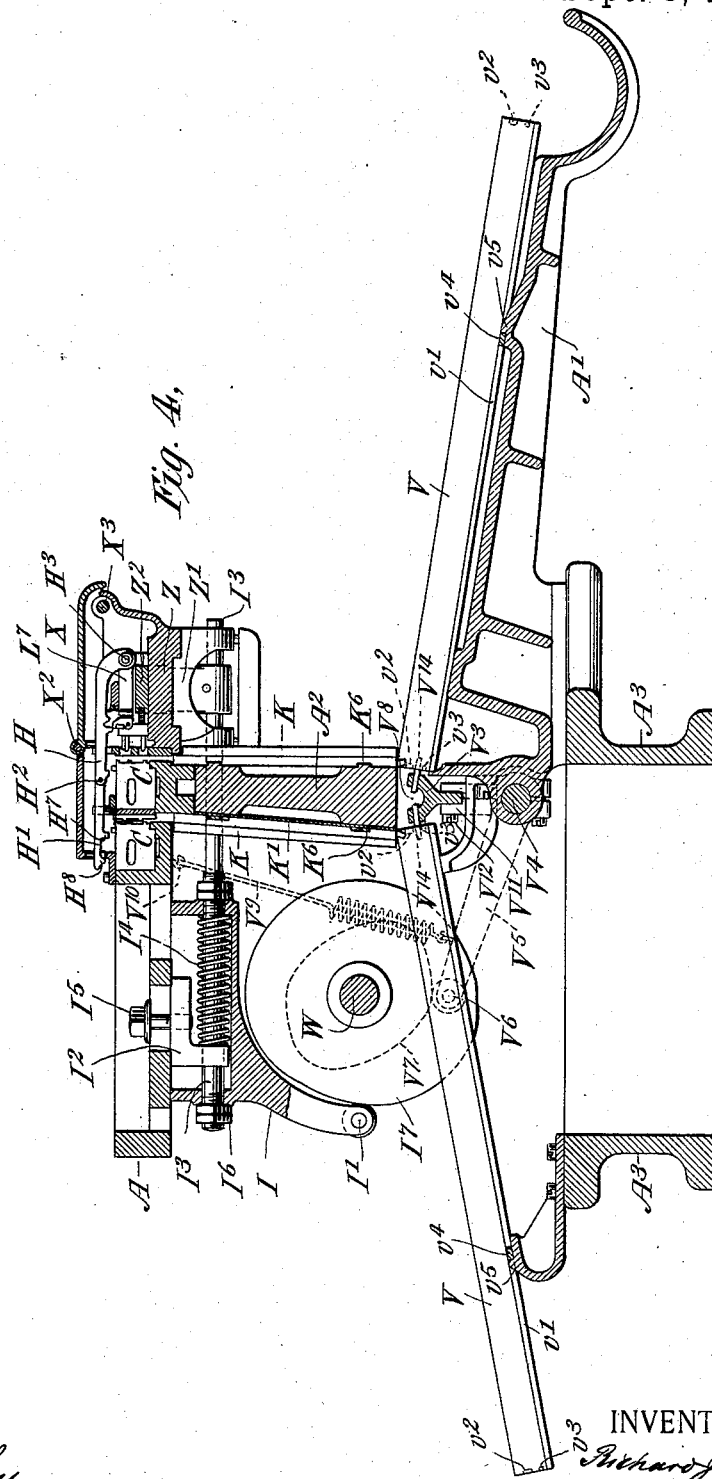
Figure 5:
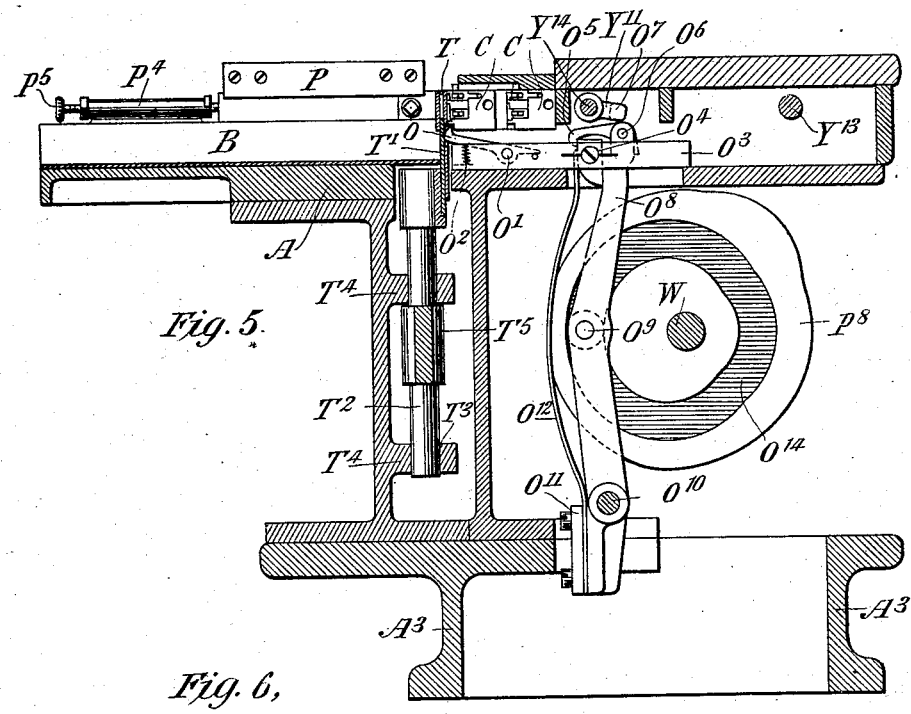
Figure 6:
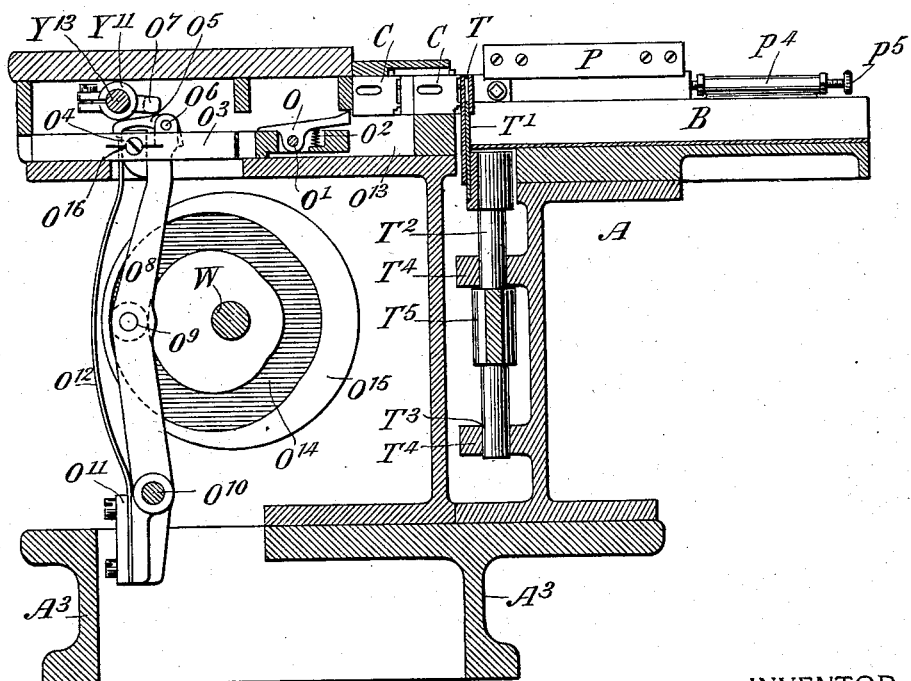
Figure 7:
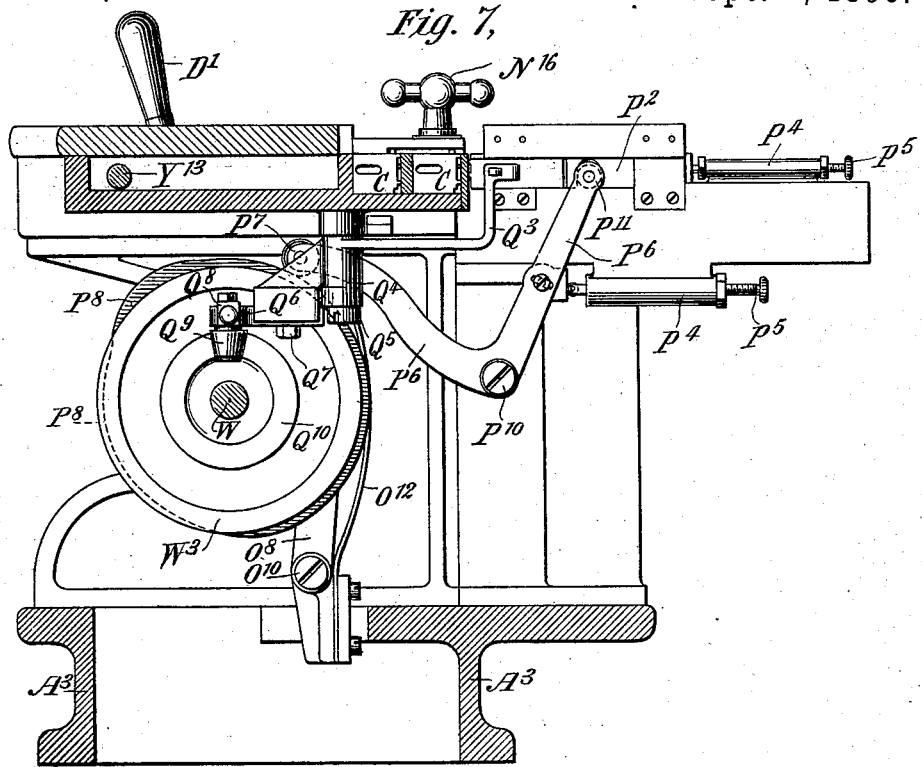
Figure 8:
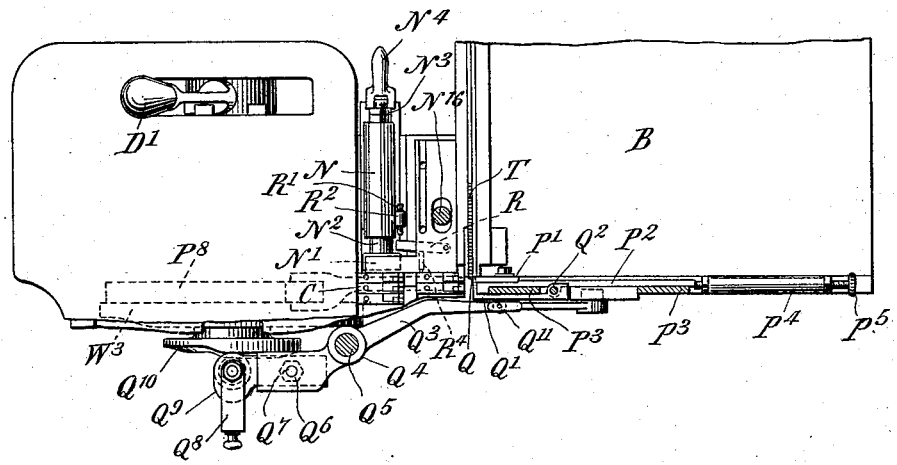
Figure 19:
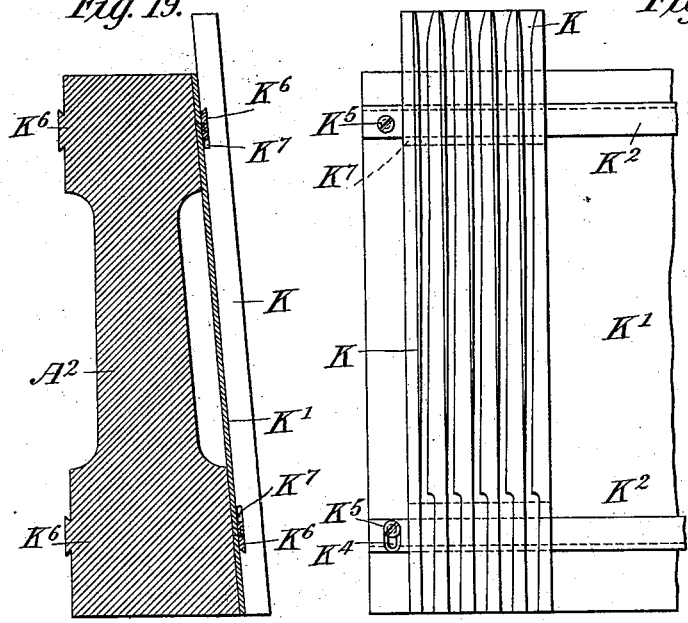
Figure 20:
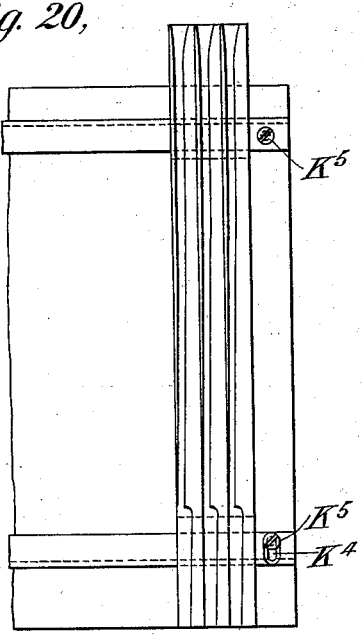
Figure 21:
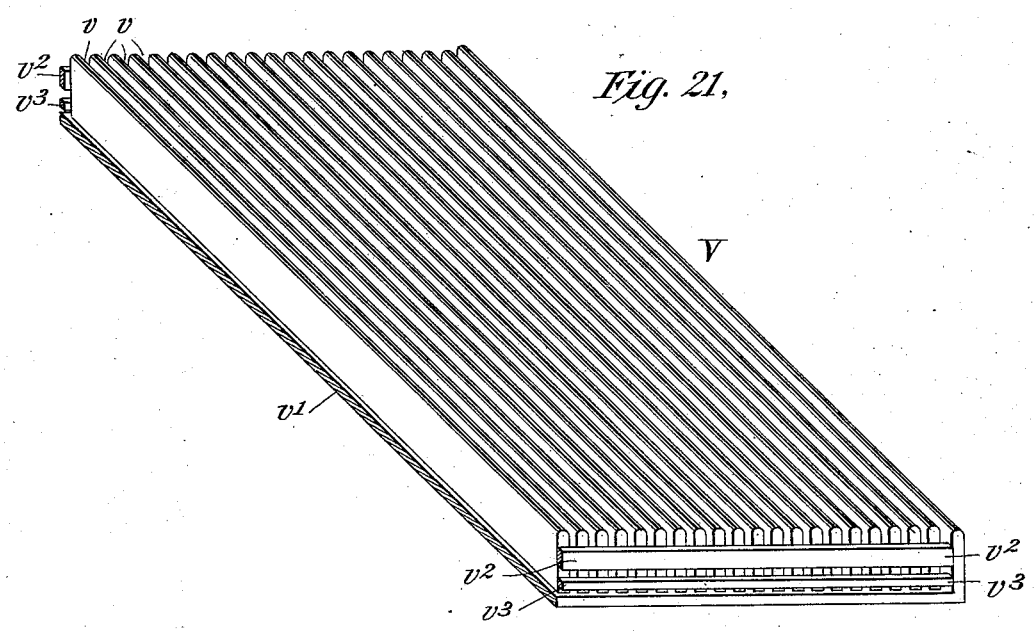

Figure 1 is a plan view of the entire machine; Fig. 2, a rear elevation of the entire machine; Fix. 3, an end view of the machine; Fig. 4, a vertical cross-section of the machine on the lines 4 4 of Fig. 1; Fig. 5, a vertical section on the line 5 5 of Fig. 2; Fig. 6, a vertical section on the line 6 6 of Fig. 2; Fig. 7, a vertical section on the line 7 7 of Fig. 2; Fig. 8, an enlarged place view of one end of the machine; Fig. 9, an enlarged view of a vertical section of the feeler mechanism and raceway through the center of the machine; Fig. 10, a plan view of the parts shown in Fig. 9. Fig. 11 is a plan view of the carriers in the rear raceway and a portion of the feeler mechanism on the line 11 11 of Fig. 12. Fig. 13 is a vertical section of the mechanism for selecting the types in the carriers in the rear raceway. Fig. 13 is a longitudinal section of the same mechanism on the lines 13 13 of Fig. 12. Fig. 14 is a view of a detail of the feeler mechanism connected with this part of the machine. Fig. 15 is an enlarged plan view of the plunger mechanism employed for advancing the carriers in the raceways and moving them at the end of the line from one raceway to the other, and for opening the ejector or clutch of the carriers for the purpose of permitting the type to be received thereon from the type-driver. Fig. 16 is a vertical elevation of the carrier. Fig. 17 is a horizontal section of one of the carriers on the line 17 17 of Fig. 11. Fig. 18 is a detailed view of the mechanism for driving the carriers in the raceways and for opening the ejector or clutch of the carrier to receive the line of type from the type-driver. Fig. 19 is an elevation of the type-channels. Fig. 20 is a cross-section of the type-channels, and Fig. 21 is a perspective view of the type-channels in which the types after distribution are collected.

Similar letters refer to similar parts throughout the several views.

For the purpose of properly explaining the present improvements the various elements found in the earlier machine, although some of them are common to all machines of the type above described, will be separately described.

In the drawings, A represents the bed-plate of the machine. $M'$ and $M^2$ represent the raceways in which the carriers travel. W represents the main driving-shaft of the machine, which is driven from any suitable source of power. D is the driving-pulley. $A^4$ $A^4$ are the supports of the bed-plate, and $A^3$ is the frame-bed of the machine. $D'$ is the starting-lever. $A^2$ is the center plate of the machine. B is the type-table or galley upon which a page of type is placed, of which there are two, one at each end. K K are the type-channels, and V V the type-cases. $M'$ and $M^2$ are the raceways, and C C, &c., the carriers. These parts are all common to every machine of the Dickinson type. We come now to the various parts of the machine.

*The Galley and its Various Parts.*

(a) The page-follower: J is the page-follower, sliding upon the horizontal rod $J'$, attached to the arm $J^2$, by means of the roller $J^3$, as shown in Fig. 1. For the purpose of keeping the page-follower J constantly pressed against the body of type to be distributed, a cord $J^5$ is attached to it by the button $J^4$. This cord $J^5$ passes over a loose pulley $J^6$ carried on a suitable bracket, Fig. 1, and at its lower end a weight $J^7$ is attached. In this manner the page-follower J is drawn forward against the first line of the page of type as the type is removed from it by the type-raiser line by line.

(b) The line-follower: S is the line-follower, which, as shown in Figs. 1 and 2, slides horizontally forward and backward on the frame $S^9$. It is provided at one side with a button $S'$, to which is attached a cord $S^3$, which passes over a loose pulley $S^4$ upon the frame $S^9$, and to the lower end of which a weight $S^5$ is attached. In this manner the line-follower S is kept constantly pressed against the line of type T, thus advancing it forward as the letters are picked off by the type-driver one by one.

(c) The type-driving mechanism: P represents generally the type-driving mechanism, which is best shown in Figs. 7 and 8. This is composed of the type-driver proper, $P'$, attached to the slide $P^2$, Figs. 7 and 8, sliding against the vertical plates $P^3$ $P^3$ on the side of the galley B. $P^6$ is a bent lever-arm, attached at $P^{10}$ to the frame of the machine and at $P^{11}$ to the type-driver slide $P^2$. $P^4$ $P^4$ are cylinders containing a spiral spring, which is adjusted by the set-screw $P^5$ $P^5$ so as to form impact-points for the bent lever-arm $P^6$, which limits the stroke of the type-driver slide $P^2$. The lower end of the bent lever-arm $P^6$ carries a roller $P^7$, which comes in contact with the cam $P^8$, provided with the boss $P^9$, on the main driving-shaft W, as shown in Figs. 2 and 7.

(d) The line-raising mechanism: This is shown in Figs. 1, 3, 5, and 6. In these T represents a line of type which has been advanced by the page-follower J over the front edge of the galley B. $T'$ is a vertical plate extending along and under the front edge of the galley, as shown in Figs. 5 and 6. The plate $T'$ is attached at its bottom to the standard $T^2$, which slides vertically in bearings $T^3$ $T^3$ in the lugs or shoulders $T^4$ $T^4$ on the frame of the machine. The standard $T^2$ carries a horizontal cross-head $T^5$, (shown in Figs. 5 and 6,) by which it is raised at the desired moment by means of a cam $G^6$ engaging with the cross-head $T^5$. The arrangement of the parts is such that when a line of type T is advanced by the page-follower and pushed over the edge of the galley the plate T will be in the position in front of the edge of the galley and on a level with the edge, and the line of type so advanced will rest upon the plate $T'$. When this has been accomplished, the cam will engage with cross-head $T^5$ on the standard $T^2$ and raise the line to the position shown in Figs. 5 and 6, and hold the same in this elevated position until the type-driver has picked off the type letter by letter.

(e) The line-closing mechanism: This is shown in Figs. 1, 2, 7, 8, and 15. It consists of a flat-faced projection Q, attached to a type finger or hook $Q'$, pivoted at the point $Q^2$ to the galley. This type-finger is normally held against the last letter of the line of type, in the position shown in Fig. 8, by the bent lever $Q^3$, terminating in a sleeve $Q^4$, pivoted on the shaft $Q^5$ to the frame of the machine. The extremity of the lever $Q^3$, which comes in contact with the type-finger $Q'$, carries a friction-roller $Q^{11}$. The lower end of the sleeve $Q^4$ carries an adjustable arm $Q^6$, attached to the sleeve by a bolt $Q^7$. This arm carries at its other end an adjustable block $Q^8$, to which is attached a beveled friction-roller $Q^9$, which is so set as to travel along the surface of a cam $Q^{10}$ on the driving-shaft $W'$. The surface of this cam is uneven, and throughout a certain distance slightly raised, so that when friction-roller $Q^9$ comes in contact with the raised portion of the surface a lateral motion will be imparted to the lever $Q^3$ and the type-finger $Q'$ will close up the end of the line and be held in such position as long as the roller is traveling over the raised portion of the cam-surface, and when the same is passed the finger will be released and the line opened for the type-follower to advance the next letter.

The Raceways.

These are situated in the main horizontal bed-plate A of the machine, and are designated by $M'$ and $M^2$. They are rectangular channels, sunken in the center, as shown in Fig. 9 at $m\ m$, for the purpose of diminishing the friction of the carriers as they pass through them. The front of each of the raceways is open, so as to permit the carriers to be acted on by the feeler mechanism. Openings $m'\ m'$ are provided in the bed-plate A, through which the types pass down into the type-channels. $M^3$ and $M^4$ represent, respectively, the rear walls of the raceway, the former of which closes the front of the rear raceway and supports the feelers for the carriers therein. The front of the front raceway $M'$ is closed by the vertical plate $M^5$. The ends of the raceways are closed by the blocks $N^6$ $N^6$ at either end. In the earlier machines the raceways are closed by blocks at either end, which slide in an opposite direction to the plungers and hold the carriers rigidly, so that the entire line of carriers is moved together. In the present case the movable blocks are replaced by the fixed blocks $N^6$ $N^6$, and the plunger at the opposite end of the line simply forces the entire line of carriers down the raceway in a body and against the block $N^6$. A cover $N^{15}$ is provided, with an opening therein, through which a handle $N^{16}$ passes, and which is arranged to slide, as shown in Fig. 15, to permit access to the clutch-opening mechanism, which will be hereinafter described. The mechanism for actuating the feeler-hooks is shown in Fig. 9. Here $I^7$ is a cam on the driving-shaft W, which cam engages with a roller $I'$ at the extremity of an arm attached to a rack I, which slides under the plate A. This rack is attached to a rod I³, which in turn connects with a lug Z' attached to the feeler-slide Z², and passing vertically downward through an opening in the bed-plate Z. A spiral spring I⁴, encircling the rod I³, serves to hold the rack I and the roller I' constantly against the surface of the cam I⁷, which is so curved that it will, during a certain time, cause the rack I to slide from right to left, and thus to advance the feeler-hooks. An adjustment of the distance through which the rack slides may be effected by the sliding bearing I², which can be adjusted with reference to the bed-plate by the screw-nut I⁵, and a further adjustment can be effected by the screw-nuts I⁶ I⁶ on the rod I³. Any other similar method of adjusting the parts may be used.

The Carriers.

The peculiar form of the carrier necessary to carry out the present invention is shown in Figs. 16 and 17. Here C represents the carrier generally, and at least as many of them are employed as there are characters in the particular font of type to be distributed. C' represents the frame of the carrier, which is of the shape shown, and C² the clutch pivoted on the pin C³ in the carrier-frame. In the old form of carrier the clutch could only be opened from one side or in one direction. In order to enable the principle of the present invention to be carried out, the clutch is so constructed and pivoted that it will open in both directions. This is accomplished by extending the extremity of the rear end of the clutch in the manner shown in Figs. 15, 16, and 17 at the point C⁴, and providing openings C⁶ and C⁵ in the wall of the carrier on either side of the clutch, through which openings a device is made to engage with the clutch and cause the same to be opened from either side. The clutch is held normally closed by the spring C⁸, which is placed in the position shown, or by means of any other convenient form of spring.

The aforesaid parts are essentially identical with the corresponding parts of the earlier machines. As will be apparent, they exist in the present machine in duplicate, in order to effect the feeding from either end into the two lines of carriers.

The various other parts of the mechanism are all essentially new, and may be described as follows:

The Carrier-Driving Mechanism.

This is indicated generally by the letter O in the drawings. It will be obvious that owing to the presence of the feeding mechanism at both ends of the line of carriers it will be impossible to drive the carriers at the left-hand end of the machine from the front raceway to the rear raceway, as is done in the early machines. Hence the plunger O is at this end of the machine arranged to draw instead of push the carriers one by one back into the rear raceway. Otherwise the parts are substantially the same as before. O³ is the plunger-bar, sliding on the bed-plate A. To this the plunger O is pivoted at O'. This bar is operated by the rock-bar O⁸, pivoted at O¹⁰ to the frame of the machine, moved by the roller O⁹, running loosely in a cam-groove O¹⁴ cut in the surface of the roller on the main driving-shaft W'. A spring O¹² is provided, attached at one end to the frame of the machine, engaging at its opposite extremity the block O⁴, over which falls the hook O⁵ of the tripping-lever, pivoted at O³ to the rocking bar O⁸. As the roller O¹⁵ rotates, the cam-groove throws the rock-bar forward and backward once in each revolution, moving therewith the sliding plunger-bar in and out. If for any reason the plunger-bar O³ gets caught so it cannot move, the lever O⁵ is tripped off of the block O⁴, and the rock-bar O⁸ ceases to push the plunger-bar forward and backward, and until the shaft is stopped it merely slides the block O⁴ forward and backward on the pin O¹⁶ until the normal conditions are restored. The left-hand carrier-plunger is, as above stated, slightly modified, as shown in Fig. 5, and is slightly hooked at its upper extremity, so as to pass under the carrier as it moves forward, and when it reaches a certain point to engage it and permit the latter to be drawn from one raceway to the other as the plunger moves backward on the slide.

The Clutch-Opening Device.

In order to open the clutch of the carriers as they come to the end of the front raceway, to enable the second type-driver to insert a letter into them, a clutch-opening device is employed, which is shown in Fig. 15. It consists of an arm R, pivoted at the point R³ to the bed-plate A. To the arm R is attached a rod R⁴, sliding in an opening R⁶ in the end plate of the raceway. This rod R passes through the opening C⁵ in the carrier which has arrived at the end of the line, and is beveled at the end, as shown in Fig. 15, so as to impinge upon the clutch C⁴ and open the same when the rod is thrown forward. A stud R² is provided upon the cylinder N, Fig. 15, which stud contains a screw-rod R', which is of such length that when the plunger is moved forward the rod impinges upon the arm R and moves it forward, and causes the rod R⁴ to slide forward in its bearing and to come in contact with the clutch of the carrier at the end of the line and open the same. A spiral or other spring R⁵, placed in suitable relation to the arm R⁴, in the present case in a bearing sunk in the end of the plate of the machine, (shown in Fig. 15,) causes the arm R and the rod R⁴ to be normally held away from the carrier C and to be advanced only at such time as the plunger moves forward.

The Various Minor Driving Mechanisms.

W represents the main driving-shaft; $D^2$, a hand-wheel at the end thereof. D is the driving-pulley, carried on the shaft W. $D'$ is the starting-handle, attached to the sleeve $D^4$ on the driving-shaft. $D^3$ $D^3$ are two worm-gears at either end of the driving-shaft, which engage with the spur-wheels $D^7$ on the cross-shafts $D^6$ $D^6$, which are supported on the bearings $D^5$ $D^5$. The shafts $D^6$ carry each two cams $G^4$ and $G^6$. The latter lifts the line-raising mechanism through the cross-bar $T^5$ and at the proper moment permits it to fall. The cam $G^4$ throws back the line-follower S by striking against the roller $G^5$ on the arms $C^3$ of the arm G, pivoted at $G'$ to the bracket $G^2$. The shafts $D^6$ ordinarily are stationary, and the worm-gear $D^3$ simply turns the loose spur-wheels $D^7$ on the shafts. When the end of the line has been entirely reached, the tripper $S^{10}$ on the line-follower raises the spring-catch $S^6$ and pushes the upper end of the lever $S^7$ from right to left a distance sufficient to throw the lower end of the lever off of spring-catch, which thereupon engages with the gear-wheel $D^7$ and causes the cam $G^4$ to make a single revolution. A spring (not shown in the drawings) forces the lever $S^7$ at the end of the revolution back to its original position.

The Throw-Off Mechanism.

This is best seen in Figs. 1, 3, 5, and 7. In order to start the machine, the lever $D'$ is drawn into a perpendicular position, and held there by the stud $Y^6$ on the lever $D'$ engaging with the stud $Y^{15}$ on the arm $Y^4$. Whenever this arm $Y^4$ is raised, the two studs above mentioned no longer engage with each other, and the spring $Y^7$, acting upon the lever $D'$, retracts it to its original position, and thereupon the machine is stopped. In order to raise the arm $Y^4$ in various contingencies, and thus to stop the machine, two shafts $Y^{13}$ and $Y^{14}$ are provided, extending the length of the machine, as shown in Fig. 1, and turning freely in openings in the framework of the machine. Attached to these shafts are the arms $Y'$ and $Y^3$, engaging with a pin $Y^{16}$ on the arm $Y^4$. When either shaft $Y^{13}$ or $Y^{14}$ is turned, the arms $Y^3$ or $Y'$ will be turned an equal distance and the arm $Y^4$ will be raised. Attached to the shafts $Y^{13}$ and $Y^{14}$ are also the arms $Y^{11}$, Figs. 1, 5, and 6, having projections $O^7$. Whenever either line-plunger encounters an obstruction and fails to move the carriers, the hook $O^5$, engaging with the block $O^4$, partially turns the block $O^4$ on its screw-pin $O^{15}$, and the block $O^5$ will thus be released and forced against the projection $O^7$, thereby turning the shaft and raising the plate $Y^4$, and thus stopping the machine, as described. A similar arrangement is provided on the bunters N, (not shown in any of the drawings, but described in previous patents,) by which when the carriers fail to move laterally the arm $N^4$ is forced down, and thereby by similar mechanism raises the plate $Y^4$, with the result above described.

The Feeler Mechanism.

This is shown in detail in Figs. 9, 10, 11, 12, 13, and 14. It is operated substantially in the same manner as the mechanism shown and described in the earlier machines, except that the mechanism is duplicated, so as to select type from the carriers of both raceways. In these views, Z is the bed-plate which supports the feeler mechanism. $Z^2$ is the feeler-slide by which the hooks and the feeler mechanism are actuated; $Z'$, a vertical arm attached to the slide passing downward through a suitable opening in the plate Z, by means of which the slide $Z^2$ is in turn moved in either direction. In the present case, instead of the series of single hooks employed in the earlier machines, a series of double or articulated hooks are employed, as shown in Figs. 9 and 10. H and $H'$ represent one such double hooks, pivoted together at $H^2$, as shown. Each of these hooks is in turn pivoted at $H^3$ to standards $H^4$, $H^4$, &c., on the bars $L^7$. $L^4 L^4$ are the nick-pins, which are fastened into the front face of the block L, attached to the end of the bar $L^7$. $L^3$ is the tripping-pin, which passes through a suitable bearing $L^9$ and the bar $L^7$ and the block L. $L^2$ is the tripping-hook, which is pivoted to the block L, as shown in Fig. 9, and is actuated by the tripping-block $L'$, which is mounted upon the tripping-pin $L^3$. The tripping-hook is normally held forward in the position shown in Fig. 9 by the spring $L^5$. The tripping-pin and the nick-pins pass out and engage with the openings cut in the face of the type in the carrier through the openings $L^8$ $L^8$ in the plate $M^5$, which closes the front raceway $M'$. $H^5$ is a lug upon the hook H, engaging with the tripping-hook $L^2$, which holds the feeler-hook H free of the ejectors E of the carriers until such time as it is tripped by the clutch of the feelers. When the nick-pins of the latter engage with the corresponding nicks in the type held by the carriers, the tripping-pin, coming in contact with the edge of the type, trips the tripping-hook and permits the hook H to drop. A second hook $H'$ is in turn provided with the lug $H^7$, arranged to engage the ejector E of the carrier C of the rear raceway $M^2$, and each of them is provided with the curved projection $H^8$, which, when the slide $Z^2$ is moved backward, come in contact with the projections $H^9$ and raise the hooks clear of the ejectors. These hooks are covered by a cover made in two parts X and $X'$, and hinged, as shown in Figs. 9 and 10, the edges of the two sections being cut away to permit the passage of the feeler-hooks H and $H'$, and being provided with the springs $X^4$ $X^5$ for the purpose of ordinarily holding the feeler-hooks down until they are raised by the action of the projections $H^9$.

For the purpose of selecting type from the rear series of carriers, the selecting mechanism shown in Figs. 9, 10, 11, 12, 13, and 14 is provided. In these views T represents, as before, a type held in the carrier C. $M^3$ represents the rear wall of the first raceway; $M^6$, a series of short vertical plates supported upon the rear plate $M^3$ of the raceway $M'$ in front of each carrier upon rods $M^7$ sliding freely in the openings $M^8$ therein. Spiral or other springs $M^8$, placed between the plates $M^3$ and $M^6$, serve to hold the plate $M^6$ against the face of the type held in the carrier C in the rear raceway $M^2$. The face of each of the plates $M^6$ is provided with lugs or projections, which are arranged to fit into corresponding openings in the type, and when the type in the carrier is so advanced that the openings will come opposite to the projections the spring will force the projections into the openings and the type will be selected from the carriers in the rear raceway in the manner hereinafter described. As will be observed from Fig. 11, the lugs $M^7$ are slightly beveled upon their front faces in order to permit them to slide easily into the nicks in the edge of the type held in the carrier, and thus effect the desired selection. Each of the extended or second feeler-hooks $H'$, which actuates the ejectors of the rear series of carriers, rests upon the arm F, Figs. 10 to 14, pivoted on the rods $F'$ to the plate $M^3$, as shown in Fig. 13. $F^2$ is a horizontal arm pivoted on the rod $F^3$ to the top of the plate $M^6$, and moves forward or backward with the plate $M^6$ as the latter moves on the sliding rods $M^{12}$ $M^{12}$. It will be obvious from these figures that if for any reason the arm $F^2$ be moved in the direction of the arrows shown in Fig. 14, the rod F will be thrown forward and the hook $H'$ will be released and permitted to fall. A spiral or other suitable spring $F^4$ is provided, which holds the arm F normally under the hook $H'$. The arm $F^2$ is provided with an extension-piece $F^5$, (shown in perspective in Fig. 14,) which is of such shape that when the plate $M^6$ moves forward, as shown in Fig. 12, and the feelers thereon, $M^7$ $M^7$, engage with the nicks in the type the projection $F^5$ will be tripped by the end of the carrier holding the type in question, in the manner shown in Fig. 11, and the arm F will thereupon be drawn from under the hook $H'$, and will assume the position shown by the central arm in Fig. 13, and the hook $H'$, together with the hook H, will be moved forward by the mechanism operating the feeler-hook, the hook will fall and clutch the ejector E of the carrier, and the type T will be ejected by the ejector E, and will be permitted to fall through the opening $m^2$ into its appropriate channel.

In Figs. 11 and 12 the mechanism is shown in the position which it assumes when the lugs $M^7$ have actually engaged with the type into the nicks of which they fit. In other words, when the selection of the particular type is completed the plate $M^6$ will be forced forward to assume the position shown in Fig. 12 by the action of the springs $M^8$, and at the instant when the plate $M^6$ reaches the position shown in Fig. 12 the pivoted bar $F^2$ will be tripped by the front of the carrier and will assume the position shown in Fig. 11 by the third carrier from the bottom of the view, and the hook $H'$ will be tripped off of the bar F and will drop to the position shown in Fig. 12. During this interval the feeler mechanism, by reason of the peculiar curvature of the cam $I^7$, will have remained stationary, as the curvature of the cam is such that the spring $I^4$ will be compressed and the feeler-slide $Z^2$ held at the extreme forward point to which it is capable of being moved; but the moment that the operation ceases either the hook H or the hook $H'$ drops by reason of the selecting mechanism having engaged the corresponding nicks in the type, and the hook thereby having been tripped off of its tripper, the curvature of the cam $I^7$ will thereupon begin to be such that the spring $I^4$ is no longer compressed, and it will cause slide $Z^2$ to move backward and the lugs $H^6$ and $H^7$ to engage with the clutch E of the appropriate carrier and eject the type therein, which thereupon falls through the openings $m'$ and $m^2$ into its appropriate type-channel. It will be observed from an examination of Fig. 9 that by connecting the hooks H and $H'$ by the pivoted joint $H^2$ either one or the other, or both, may be tripped, according to whether or not the nick-pins $L^4$ and the nick-lugs $M^7$ select or do not select type from one or the other, or both, of the carriers in the two raceways. For example, in Fig. 9 the feeler-hooks are shown in the operation of being drawn backward from right to left by the feeler-slide $Z^2$, and yet, neither of them having been tripped, the lugs $H^6$ and $H^7$ slide clear of the clutches E of both of the carriers. If, however, the hook $H'$ had been tripped, then it would have assumed, with reference to the hook H, the position shown in Fig. 12, and if moved back in the way indicated in Fig. 9 it would trip the clutch of the carrier in the rear raceway, as it is about to do in Fig. 12, and yet at the same time the hook H, not having been tripped by reason of the fact that no selection took place from the carrier in the front raceway, the lug $H^6$ would still be drawn clear of the ejector E in the front raceway, and that carrier and the type held therein would be moved on by the carrier-driving mechanism at the next throw of the machine. The reverse operation would take place if the hook H had been tripped by reason of selection from the type of the first carrier. In such case the hook $H'$ would retain substantially the position shown in Fig. 9, except that the hook H having fallen and being held down by the spring $X^4$, the hook $H'$ would have been slightly tilted on the rod F, and the spring $X^5$ in the cover $X'$ would be slightly compressed. This condition of things is shown by the dotted lines in Fig. 9.

The above description refers to a single set of feeler-hooks only, but, as will be apparent from the drawings, as many separate sets of feeler mechanism are provided as there are letters or characters in the font of type used, the mechanism being in each case the same and the operation of the feelers the same throughout the entire machine.

Type-Guiding Apparatus.

This is shown in Figs. 19, 20, and 21. It consists of a plate $K'$, attached to the vertical bed-plate of the machine $A^2$ by the screws $K^5$ through the horizontal bars $K^2$ and slightly inclined, as shown. To these bars are attached the space-conductors K K by means of the mortised lugs $K^6$ $K^6$ on the vertical bed-plate $K'$ by means of the dovetailed slots $K^7$ $K^7$ cut in the rear faces of the type-conductors. The type-channels V V extend outwardly from the foot of the conductors and are supported on the plate $V^2$ by the frame $V'$ $V'$, as shown in Fig. 21. The type-conductors proper, K, Figs. 19 and 20, are a series of rectangular boxes, open in front, and grooved, as shown in Fig. 20, so as to give to the type a quarter turn as they fall, in the same manner as shown in the earlier machines. These are placed side by side, as shown in Fig. 20. In the earlier machines the type-conductors were attached to the vertical bed-plate $A^2$ by means of mortised grooves on their rear surface, which fitted into beveled lugs on the surface of the vertical plate $A^2$. In order to remove any one of the inner conductors when thus attached, all of the conductors before it in the row in the line had to be removed before the particular conductor which it was desired to remove could be slipped out. To obviate this difficulty, the beveled lugs are replaced by the slats $K^6$ $K^6$, Figs. 19 and 20. As will be observed, the upper of these slats is beveled or mortised on its upper edge only and the lower one is beveled or mortised on its lower edge only. These slats are attached through the plate $K'$ to the bed-plate $A^2$, as shown in Fig. 20. The upper is simply screwed in by the screw $K^5$ at either end, while the latter is provided with the slots $K^4$ $K^4$ at either end, so that by loosening the screws $K^5$ the slat may be slightly raised or lowered in reference to its position on the bed-plate $K'$. The grooves on the rear faces of the type-conductors K are made slightly wider than the width of the slats $K^6$, are beveled, the former at the top and the latter at the bottom only, as shown in Fig. 19, so that a space $K^7$ exists between the slot and the slat at both top and bottom, as shown in Fig. 19. The result of this construction is that when it is desired to remove any one of the conductors all that is necessary to do is to unscrew the lower screws $K^5$, loosen the lower slat, raise it a little in the slot, so as to fill up the lower space $K^7$, whereupon the conductor may be pushed up on the upper slat a distance equal to the space $K^7$ and the beveled edge of the conductor will be released from the beveled edge of the slat and the former may be readily removed. For the purpose of replacing, the operation is effected in the reverse order.

The Type-Advancing Mechanism.

For the purpose of advancing the type as it descends from the type-conductors K and enters the head of the type-channels, a device is provided, which is shown in Fig. 4. In this view V V represent the type-cases, of the general character shown in Fig. 21. There are two of such type-cases, one at either side of the vertical bed-plate $A^2$, inclined, as shown in Fig. 4, and supported on the frame $A'$. These are divided interiorly into as many channels $v$ as there are type-conductors K and characters in the font of type to be distributed. They are composed of a bottom plate $v'$, and the ends of the channels are closed by the horizontal rod $v^2$ and $v^3$. The type-cases V are not attached to the plate $A'$, but simply rest thereon and are held in position by the cross-bars $v^4$, which rest in suitable shoulders $v^5$ formed in the plate $A'$. In this way the cases may be removed and replaced from time to time as they become full. For the purpose of advancing the type down the channels $v$ $v$, a reciprocating bunter $V^8$ is provided, which bunter is composed of a Y-shaped bar of metal extending beneath the vertical bed-plate $A^2$ the entire length of the same. This bunter is attached at the base to a rocking shaft $V^4$, (shown in Fig. 4,) which is arranged to rock upon a suitable bearing in the bed-plate of the machine. The shaft $V^4$ is rocked by means of a lever-arm $V^5$, the extremity of which carries a roller $V^6$. An irregularly-shaped cam $V^7$ is provided on the main driving-shaft W of the machine, and the lever-arm $V^5$ is normally held against the surface of this cam by a spring $V^9$, attached to any fixed point, such as $V^{10}$, on the bed-plate of the machine. The configuration of this cam is such that it will impart a reciprocating motion to the lever $V^5$, which in turn will cause the Y-shaped bunter to vibrate on the rock-shaft $V^4$ from right to left. The two arms of the Y are provided with the pushers $V^{14}$, there being as many of these as there are channels $v$ in the type-cases V, so that as the type falls from the conductor K into the channel V it is immediately pushed down into the channel and against the next letter in the line already formed in the channel. This operation is continuous as long as the machine is running. In order to effect an adjustment of the bunter $V'$ vertically, it is attached to the rock-shaft $V^4$ by the arms $V^{11}$, and an adjustment may be effected by the screw-nut $V^{12}$.

The Carrier-Advancing Mechanism.

The mechanism which is employed in the present invention for closing up the line of carriers and advancing them step by step along the raceway is shown in Figs. 2, 8, 15, and 18, and also generally in Fig. 1. Here $N'$ $N'$ represent the two plungers at opposite ends and on the opposite side of each raceway; $N^6$, the blocks which close up the ends of the raceways not occupied by the plungers and which are consequently placed at opposite ends and on the opposite side of each raceway; $N^{16}$, the handle upon which the cover $N^{15}$ slides; $N^2$, the plunger-rods, which, as in the earlier form of machine, are arranged to slide in the cylinders N, each of which contains a spring which normally holds the plunger in the position shown in Fig. 15, and is adjustable by the nut $N^3$. A handle $N^4$ is provided, as shown in Fig. 15, for the purpose of releasing the plunger in case of any sticking of the parts. This block and the mechanism of the cylinders N, being found in all the earlier machines, will not be described further here. For the purpose of avoiding the use of the complicated mechanism employed in the earlier machines for moving up the end blocks to meet the carriers and then moving up the carriers in one solid continuous line, and then releasing the line so as to permit the plunger to operate on the end carrier when the line is released, a series of levers is employed, which is shown in Fig. 18. In Figs. 1 and 2, $W^3$ is a cam attached to the main driving-shaft W of the machine, which cam, as will appear from these figures, has one surface—namely, that shown on the right-hand side in the drawings—beveled, so that when the cam comes in contact with a roller $N^8$, pivoted to a slide $N^{12}$ under the bed-plate of the machine, it will cause this slide to move to the right so long as the roller $N^8$ is in contact with the thicker surface of the cam, and when relieved therefrom to stop and to be restored to its former position by any convenient form of spring, such, for example, as the spring $N^{13}$ on the rod $N^7$, attached to the slide $N^{12}$, as shown in Figs. 1 and 2. Each of the plungers is supported on a slide $N^{14}$, arranged to slide in opposite directions at opposite ends of the two raceways in any convenient form of bearing. One of these slides is rigidly attached to the slide $N^{12}$ by the bent rod $N^5$. The other is attached through the pivoted lever $N^9$, pivoted on the bottom of the bed-plate of the machine by the pivots $N^{10}$ and $N^{11}$. As a result of this construction, when the slide $N^{12}$ is moved from right to left the right-hand plunger will be moved in the same direction, whereas the left-hand plunger will be moved in the opposite direction, and when the slide $N^{12}$ is moved in the opposite direction the reverse condition of things will take place. In each case the line of carriers is forced through the raceway in the opposite direction until they come in contact with and stop at the blocks $N^6$ $N^6$, which close the raceway. The clutch of carriers is opened at the right-hand end of the machine by a knob on the end of the plunger $N'$, which passes through the opening in the side of the carrier and touches the clutch $C^6$, and when the carriers are forced together in the raceway the knob, engaging with the clutch, opens it and permits a type to be inserted. In order to permit each clutch to be opened without interfering with the adjacent carrier, a groove $C^7$ is provided on the side of each carrier to fit the clutch when opened, as shown in Fig. 17.

The method of operation of the machine is as follows: A page of type to be distributed is placed upon each of the galleys B B, the page-follower is set, and the starting-handle moved. The shaft W begins to rotate, and thereupon the carriers begin to travel down the raceways; the first line of type is raised by the line-lifter from the page on each galley and simultaneously advanced by the line-follower. As the carriers at the right-hand end of the machine, Fig. 2, are advanced from the rear raceway to the front raceway by the plunger mechanism, the clutch of the carrier is opened by the plunger-knob and a type is separated from the end of the raised line and forced by the type-plunger into the carrier. At the same instant the clutch of that one of the carriers which has arrived at the end of the front raceway $M'$ in its journey from right to left is opened by the pin $R^4$ passing through the opening in the carrier and coming in contact with the clutch, and the type-plunger of the left-hand table inserts therein a single type from the line of type lifted from the left-hand galley. This carrier is then drawn by the carrier-plunger at the left-hand end of the machine from the front to the rear raceway. The line of carriers in the raceway are then closed up by the line-plungers o, and when thus closed the entire line of carriers is moved one step down the front race and one step along the rear raceway and then stop. At this instant the feeler mechanism begins to operate, and each character in each carrier in each line is subjected to the action of the duplicate sets of feeling mechanism. In each case where the nick-pins or selectors of the feeling mechanism enter the appropriate nicks or cuts in a character of type held in a carrier, the tripping-rod will operate to trip the tripping-hook. This in turn will permit the corresponding feeler-hook to fall and engage with the ejector of the carrier, whereupon the feeler-hook will be moved backward by the action of the cam upon the main driving-shaft, and the ejector will cause the particular type to be ejected from the carrier and to fall down the passages $m'$ and $m^2$ into the type-channels, from which they will be forced by the bunters into their appropriate case. As each carrier reaches the left-hand end of the front raceway, the clutch will be opened so as to permit of the insertion of a type by the plunger of the left-hand table. It will be obvious that as the two portions H and H' of the feeler-hooks are pivoted they will fall quite independently of each other according to the character that may be presented to the selecting mechanism, although the selecting mechanism of each is arranged to select the same character, and although both will be moved laterally forward or backward by the throw of the cam on the driving-shaft. It will be apparent, therefore, that when the machine is working one line of carriers is traveling from right to left down the front raceway, each containing a type, and that each is stopped for an instant in front of each pair of feeler-pins, and is there subjected to the operation of selection, and that at the same time a second line of carriers is traveling from left to right up the rear raceway, each also containing a type, each of which is stopped at the same moment as the carriers of the front raceway, and each is at the instant that the front carriers of the raceway are subjected to the selection subjected by similar nick-pins to a similar selection. Consequently each pair of nick-pins must, during the entire travel of the line, select one type from each line of carriers, and as there are as many carriers and different sets of selecting mechanism as there are different characters in the font to be distributed all the characters will have been selected, and the carriers will all have been emptied by the time they reach the end of either line, as no one character can pass all of the selecting-pins. As soon as any character is selected and ejected, the projection $H^8$ on the feeler-hook, as it slides backward, is engaged by the projection $H^9$ on the frame of the machine. This lifts each portion of the feeler-hooks for an instant a sufficient distance to permit the slide of the hooks to carry them clear of and then rest upon the tripping-hook in the case of the hook H and the tripping-lever F in the case of the hook H', where they will be held until such time as the selecting-pins select a new character and they fall and engage the ejector, as before.

During the operation of the machine the various other portions of it, such as, for example, the page-follower, the line-lifter, the line-follower, and the carrier-plungers, are all operated in substantially the same manner as in the earlier machine. Thus, for example, the page-follower J is being continually advanced by the weight $J^7$, attached to the cord $J^5$, running on the roller $J^6$; the line-follower is constantly being advanced by the weight $S^5$, attached to the cord $S^3$, passing over the roller $S^4$, until such time at the stop $S^{10}$ comes in contact with the arm G, at which time the cam $G^4$ will be rotated with the shaft $D^6$ through the wheel $D^3$, and will engage with the roller $G^3$ and force the arm G and the line-follower back to its original starting-point, ready to begin to advance a new line; the line-lifter will be lowered at the moment that the last letter is pushed by the type-plunger into the carrier by a suitable cam on the driving-wheel, and will, as soon as a new line is advanced, raise the same and permit the type-follower to begin its work. The starting-handle D' is connected by a sleeve $D^4$ with the driving-shaft W, carrying the driving-pulley $D^3$ $D^2$, &c., and if for any reason any part of the machine gets clogged or stuck the connection between the driving-shaft and the starting-handle is thrown off and the machine will stop substantially in the same manner as was the case with the earlier machine.

I claim as my invention—

1. In a type-distributing machine, the combination of a single set of carriers, traveling in separate lines in opposite directions, in parallel raceways, each containing a type, and appropriate selecting mechanism, for each raceway; whereby each carrier, at each pause of the line in each raceway, is subjected to the action of the selecting mechanism.

2. In a type-distributing machine, the combination, with a single set of carriers, traveling in separate lines in opposite directions, in parallel raceways, each containing a type, of a set of independently-acting selecting mechanism for each raceway; whereby each carrier at each pause of the line, in each raceway, is subjected to the action of the selecting mechanism.

3. In a type-distributing machine, the combination with the principal feeler-hook of the articulated extension-hook, for actuating the ejectors of the carriers of the rear raceway.

4. In a type-distributing machine, the combination with the independent sets of feeler mechanism, of the articulated feeler-hooks for the purposes set forth.

5. In a type-distributing machine, the combination with the two lines of carriers in the raceways, of the articulated feeler-hooks, each engaging with the ejectors of the carriers, and the independent sets of feeler mechanism for actuating the different joints of the hooks independently.

6. In a type-distributing machine, the combination with the articulated feeler-hooks, of a cover made in sections as described, an opening in the vertical edges of the sections through which the feeler-hooks pass, and the springs in the openings, engaging with the feeler-hooks for the purposes set forth.

7. In a type-distributing machine, the combination with the line of carriers in the front raceway, a plunger closing the rear raceway, substantially as described, and means substantially as described, operated from said plunger, for opening the clutch of the last carrier on reaching the end of the front raceway.

8. In a type-distributing machine, the combination with the feeler-hooks of the projecting edges $H^9$ for lifting the feeler-hooks upon the tripping-hooks after they have engaged and moved the ejectors of the carriers.

9. In a type-distributing machine, the combination with the principal feeler-hook of the adjustable projecting edges H$^9$ on the frame of the machine for lifting the feeler-hook upon the tripping-hook after it has engaged and moved the ejectors of the carriers.

10. In a type-distributing machine, the combination with the carrier, of a pivoted clutch extended backward toward the rear end of the carrier, and an opening in the side walls of the latter, whereby the clutch may be opened by pressure exerted through said opening upon the rear end of the clutch.

11. In a type-distributing machine, the combination with the plungers at the end of a raceway, of a plate sliding on the bed-plate of the machine, a lever-arm connecting one of said plungers to said slide, an arm connecting the other plunger to said slide, a roller on the slide, and a suitable cam on the driving-shaft, provided with a beveled surface engaging with the roller, whereby the plungers are caused to move equally in opposite directions; and a retracting-spring for moving the mechanism in the opposite direction, when the cam is released from the rollers.

12. In a type-distributing machine, the combination with the back plate of the type-conductors, of adjustable slats, beveled as described, means for attaching the same to the back plate as described, and separate type-conductors provided with beveled slots upon their rear faces, of greater width than the beveled slats, for the purposes set forth.

13. In a type-distributing machine, the combination of two sets of carriers traveling in opposite directions in parallel raceways, a set of independent selecting-pins opposite to each carrier, an articulated feeler-hook composed of two parts one of which is arranged to engage the ejector of the carrier in the front raceway and the other to engage the ejector of the carrier in the rear raceway, means substantially as described whereby the feeler-hook is actuated from the driving-shaft of the machine, and independent tripping mechanism for each pair of selecting-pins, whereby each joint of the feeler-hooks may be tripped separately.

14. In a type-distributing machine, the combination with the line of carriers in the rear raceway, of a longitudinal plate carrying suitable selecting-pins, arranged to trip the tripping-hook and actuate the feeler-hook, when the selecting-pins engage with the nicks in the type in the carrier.

15. In a type-distributing machine, the combination with two sets of feeler-hooks acting on the front and rear lines of carriers, of reversible type-cases inclosed at each end by slats placed end to end and a reciprocating bunter for forcing the type down into the same, and mechanism, substantially as described, for actuating the bunter from the main driving-shaft of the machine.

16. In a type-distributing machine, the combination with nick-pins actuating the ejectors of one set of carriers, of a plate M$^6$ provided with the projections M$^7$, corresponding with the nicks in the types, mounted on rods M$^{12}$ and held against the line of type by springs M$^8$ actuating the ejectors of the other set of carriers.

17. In a type-distributing machine the combination with articulated feeler-hooks and the nick-pins actuating the ejector mechanism of one set of carriers, of a pivoted arm arranged to engage with one end the front edge of an advancing carrier when selection is effected of the type carried therein and with the other end to trip the feeler-hook from its support and allow it to drop.

18. In a type-distributing machine, the combination with a single set of carriers traveling in parallel raceways, and selecting mechanism for each raceway, of independent sets of type-feeding mechanism for inserting type into each line of carriers simultaneously, substantially as described.

19. In a type-distributing machine, the combination with a single set of carriers traveling in two parallel raceways in opposite directions, of two independent sets of type-feeding mechanism for inserting type into each line of carriers, simultaneously, from opposite ends of the lines.

20. In a type-distributing machine, the combination with a single set of carriers, traveling in separate lines in parallel raceways, in opposite directions, of feeding mechanism for inserting type into each line of carriers, simultaneously, at opposite ends, and a galley from which type is inserted into each line of carriers, and a type-plunger, line-lifter and line-follower, connected with each galley, substantially as described.

21. In a type-distributing machine, the combination with a single set of carriers traveling in two separate lines in parallel raceways, of two independent sets of type-feeding mechanism substantially as described for inserting type in each line of carriers, two sets of selecting mechanism substantially as described, for selecting type from each carrier in each line, and a series of independent type-conductors for each line of carriers, whereby the type discharged therefrom is carried into and assembled in suitable type-cases.

In testimony that I claim the foregoing as my invention I have signed my name, in presence of two witnesses, this 1st day of November, 1895.

RICHARD J. MOXLEY.

Witnesses:
C. A. FOWLER,
JOHN FRENCH.